US011382052B2

(12) United States Patent
Yang et al.

(10) Patent No.: US 11,382,052 B2
(45) Date of Patent: Jul. 5, 2022

(54) SYNCHRONIZATION METHOD AND APPARATUS, NETWORK ELEMENT, AND STORAGE MEDIUM

(71) Applicant: ZTE CORPORATION, Guangdong (CN)

(72) Inventors: Li Yang, Guangdong (CN); He Huang, Guangdong (CN); Yuan Gao, Guangdong (CN)

(73) Assignee: ZTE CORPORATION, Guangdong (CN)

(*) Notice: Subject to any disclaimer, the term of this patent is extended or adjusted under 35 U.S.C. 154(b) by 190 days.

(21) Appl. No.: 16/650,850

(22) PCT Filed: Jun. 29, 2018

(86) PCT No.: PCT/CN2018/093804
§ 371 (c)(1),
(2) Date: Mar. 25, 2020

(87) PCT Pub. No.: WO2019/062244
PCT Pub. Date: Apr. 4, 2019

(65) Prior Publication Data
US 2020/0280937 A1  Sep. 3, 2020

(30) Foreign Application Priority Data

Sep. 28, 2017  (CN) .......................... 201710901674.2

(51) Int. Cl.
*H04W 56/00*  (2009.01)
*H04W 76/27*  (2018.01)
(Continued)

(52) U.S. Cl.
CPC ......... *H04W 56/001* (2013.01); *H04L 5/0053* (2013.01); *H04L 69/322* (2013.01);
(Continued)

(58) Field of Classification Search
CPC ... H04W 56/001; H04W 76/27; H04W 24/10; H04W 28/0268; H04W 56/0045;
(Continued)

(56) References Cited

U.S. PATENT DOCUMENTS

2015/0110095 A1  4/2015  Tan et al.
2015/0143456 A1*  5/2015  Raleigh ............... H04W 12/088
                                                                              726/1
(Continued)

FOREIGN PATENT DOCUMENTS

CN     101547403     *   9/2009
CN     101547403 A       9/2009
(Continued)

OTHER PUBLICATIONS

3rd Generation Partnership Project; Technical Specification Group Core Network and Terminals; Interface between the Control Plane and the User Plane of EPC Nodes; Stage 3 (Release 14)—3GPP TS 29.244 V14.0.0 (Jun. 2017).
(Continued)

*Primary Examiner* — Mewale A Ambaye
(74) *Attorney, Agent, or Firm* — KDB Firm PLLC

(57) ABSTRACT

Disclosed is a synchronisation method and apparatus. The method includes steps described below. A control plane (CP) entity determines content to be counted, an object and a reporting policy for performing a synchronisation operation, where the synchronisation operation includes at least one of: a working status synchronisation operation or a resource status synchronisation operation; and the CP entity sends a request for the synchronisation operation to a user plane (UP) entity, where the request carries configuration information about the content to be counted, the object and the
(Continued)

reporting policy for the synchronisation operation. Further disclosed are a network element and a computer-readable storage medium.

19 Claims, 8 Drawing Sheets

(51) Int. Cl.
*H04L 5/00* (2006.01)
*H04L 69/322* (2022.01)
*H04W 24/10* (2009.01)
*H04W 28/02* (2009.01)

(52) U.S. Cl.
CPC ....... *H04W 24/10* (2013.01); *H04W 28/0268* (2013.01); *H04W 56/0045* (2013.01); *H04W 76/27* (2018.02)

(58) Field of Classification Search
CPC ..... H04W 76/10; H04W 56/00; H04W 76/22; H04W 28/02; H04L 5/0053; H04L 69/322; H04L 1/00; H04L 5/00
See application file for complete search history.

(56) References Cited

U.S. PATENT DOCUMENTS

| | | | | |
|---|---|---|---|---|
| 2017/0331577 | A1* | 11/2017 | Parkvall | H04L 5/1469 |
| 2020/0014512 | A1* | 1/2020 | Ramadan | H04L 5/0048 |
| 2020/0252980 | A1* | 8/2020 | Anand | H04L 1/0002 |

FOREIGN PATENT DOCUMENTS

| | | |
|---|---|---|
| CN | 101931876 A | 12/2010 |
| CN | 104094536 A | 10/2014 |
| CN | 106102106 A | 11/2016 |
| EP | 3011785 A1 | 4/2016 |
| WO | 2016105570 A1 | 6/2016 |
| WO | 2017045708 A1 | 3/2017 |

OTHER PUBLICATIONS

Huawei: "Technical White Paper on Cloud-based BNG with Control Plane and User Plane Separated with Architecture" Feb. 25, 2017, p. 1, retrieved from the Internet: https://carrier.huawei.com/~/media/CNBG/Downloads/track/CU-Separated-BNG-Architecture_EN.pdf.

European Search Report and Written Opinion for the Application No. EP18863335, dated May 21, 2021, 9 pages.

Zhuo et al., "Discussion on 5G NR Networking Mode and Introduction Route" 5G Network Technology—Aug. 2016, pp. 116-118.

Office Action for Application No. 201709016742, dated Sep. 29, 2020, 4 pages.

Search Report for Application No. 201709016742, dated Sep. 29, 2020, 3 pages.

International Search Report for the International Patent Application No. PCT/CN2018/093804, dated Sep. 25, 2018, 2 pages.

* cited by examiner

SYNCHRONIZATION METHOD AND APPARATUS, NETWORK ELEMENT, AND STORAGE MEDIUM

CROSS-REFERENCES TO RELATED APPLICATIONS

This is a National stage application, filed under 37 U.S.C. 371, of International Patent Application NO. PCT/CN2018/093804, filed on Jun. 29, 2018, which is based on and claims priority to a Chinese patent application No. 201710901674.2 filed on Sep. 28, 2017, disclosure of which is incorporated herein by reference in its entirety.

TECHNICAL FIELD

The embodiments of the present disclosure relate to, but are not limited to, the field of communication technologies and, in particular, to a synchronisation method and apparatus, a network element, and a storage medium.

BACKGROUND

Along with the fifth generation (5G) mobile communication era, massive connectivity and higher data transmission rate requirements of users pose a great challenge on transmission capacity of a common public radio interface (CPRI) of a fronthaul interface between a baseband unit (BBU) and a remote radio unit (RRU) in the long term evolution (LTE) system. Since a CPRI interface is used for transmitting in-phase quadrature (IQ) signals processed by physical layer encoding and modulation and the like, and a corresponding digital bit string rate is huge, the CPRI interface has a higher requirement for transmission delay and bandwidth, and is otherwise unable to work for the BBU and the RRU. When an air interface of a 5G gNB has an increased rate of tens of Gbps, the requirement for traffic transmission of the CPRI interface will reach a Tbps level, which puts tremendous pressure on deployment costs and difficulties of a fronthaul network interface. Therefore, in the 5G new radio (NR), a division manner of the fronthaul network interfaces within the gNB needs to be redefined.

Various aspects such as transmission capacity, transmission delay and deployment convenience need to be considered in terms of the division manner of the fronthaul interfaces. For example, considering non-ideal fronthaul transmission, delay-insensitive network functions are implemented in a first network element (such as a centralized unit (CU)), and delay-sensitive network functions are implemented in a second network element (such as a distributed unit (DU)).

A centralized deployment gNB may include one gNB-CU and multiple gNB-DUs under the jurisdiction of the gNB-CU, which are connected through fronthaul link logical interfaces F1, for example, an F1-C interface or an F1-U interface. One gNB-DU can merely be connected to and managed by one gNB-CU, and no direct interface exists between the gNB-DU and the neighboring gNB-DUs. From the outside, both NG interface and Xn interface are terminated on gNB-CU units, and the gNB-DUs are not visible to the outside. In order to ensure reliability, from the perspective of actual deployment, one gNB-DU may also be connected to multiple gNB-CUs.

SUMMARY

Embodiments of the present disclosure provide a synchronisation method and apparatus, a synchronisation network element and a storage medium.

An embodiment of the present disclosure provides a synchronisation method. The method includes steps described below.

A control plane (CP) entity determines content to be counted, an object and a reporting policy for performing a synchronisation operation, where the synchronisation operation includes at least one of: a working status synchronisation operation or a resource status synchronisation operation.

The CP entity sends a request for the synchronisation operation to a user plane (UP) entity, where the request carries configuration information about the content to be counted, the object and the reporting policy for the synchronisation operation.

An embodiment of the present disclosure further provides a synchronisation method. The method includes steps described below.

A user plane (UP) entity receives a request for a synchronisation operation sent by a CP entity, where the request carries configuration information about content to be counted, an object and a reporting policy for the synchronisation operation, where the synchronisation operation includes at least one of: a working status synchronisation operation or a resource status synchronisation operation.

The UP entity determines acceptance or rejection of the request and the configuration information in the request, and sends a response to the synchronisation operation to the CP entity, where the response carries feedback information about accepting or rejecting the request, and in response to determining that the request is accepted, the response further carries feedback information about accepting all or part of the configuration information carried in the request.

An embodiment of the present disclosure further provides a synchronisation apparatus. The apparatus includes a first determining module and a first sending module.

The first determining module is configured to determine content to be counted, an object and a reporting policy for performing a synchronisation operation, where the synchronisation operation includes at least one of: a working status synchronisation operation or a resource status synchronisation operation.

The first sending module is configured to send a request for the synchronisation operation to a user plane (UP) entity, where the request carries configuration information about the content to be counted, the object and the reporting policy for the synchronisation operation.

An embodiment of the present disclosure further provides a synchronisation apparatus. The apparatus includes a second receiving module, a second determining module and a second sending module.

The second receiving module is configured to receive a request for a synchronisation operation sent by a CP entity, where the request carries configuration information about content to be counted, an object and a reporting policy for the synchronisation operation, where the synchronisation operation includes at least one of: a working status synchronisation operation or a resource status synchronisation operation.

The second determining module is configured to determine acceptance or rejection of the request and the configuration information in the request.

The second sending module is configured to send, according to a decision of a determining module, a response to the synchronisation operation to the CP entity, where the response carries feedback information about accepting or rejecting the request, and in response to determining that the request is accepted, the response further carries feedback information about accepting all or part of the configuration information carried in the request.

An embodiment of the present disclosure further provides a non-transitory computer-readable storage medium, which is configured to store computer-executable instructions for executing the synchronisation method described above.

An embodiment of the present disclosure further provides a network element. The network element includes a transceiver, a memory and a processor, where the processor is connected to the transceiver and the memory separately, and configured to control information transceiving of the transceiver and information storage of the memory by executing computer-executable instructions and to implement the synchronisation method described above.

The embodiment of the present disclosure includes steps described below. A control plane (CP) entity determines content to be counted, an object and a reporting policy for performing a synchronisation operation, where the synchronisation operation includes at least one of: a working status synchronisation operation or a resource status synchronisation operation; the CP entity sends a request for the synchronisation operation to a user plane (UP) entity, where the request carries configuration information about the content to be counted, the object and the reporting policy for the synchronisation operation. In the embodiment of the present disclosure, the CP entity sends the request for the synchronisation operation to the UP entity, and thus status of various information content to be synchronized within the UP entity can be tracked in time (such as, in real time).

In an embodiment, a corresponding control plane response operation may be performed according to a counting result of the synchronisation operation reported by the UP entity, thereby enabling the UP entity to work more effectively and efficiently, for example, a UP resource is more reasonably utilized, data transmission on a data radio bearer (DRB) is recovered to normal in time, and a fault in the UP entity is cleared in time, etc.

In an embodiment, the CP entity can configure different objects of the synchronisation operation with different granularity levels, and different content to be counted can be associated to different granularity operation objects.

In an embodiment, the CP entity can configure the UP entity to perform the synchronisation operation by means of event definition triggering, time period triggering, and event and time period triggering, and can achieve a balance between real-time of the synchronisation operation and effect efficiency overhead cost according to the real-time requirements of different information content to be synchronized.

BRIEF DESCRIPTION OF DRAWINGS

The drawings are used to provide a further understanding of the technical solutions of embodiments of the present disclosure, constitute a part of the specification, explain the technical solutions of the present disclosure in conjunction with the embodiments of the present disclosure, and do not limit the technical solutions of the embodiments of the present disclosure.

DETAILED DESCRIPTION

Embodiments of the present disclosure will be described below in detail in conjunction with the drawings. It is to be noted that if not in collision, the embodiments and features therein may be combined with each other.

The steps illustrated in the flowcharts of the drawings may be performed by a computer system such as a group of computers capable of executing instructions. Further, although logical sequences are shown in the flowcharts, the shown or described steps may be performed in sequences different from those described herein in some cases.

Figure 1:
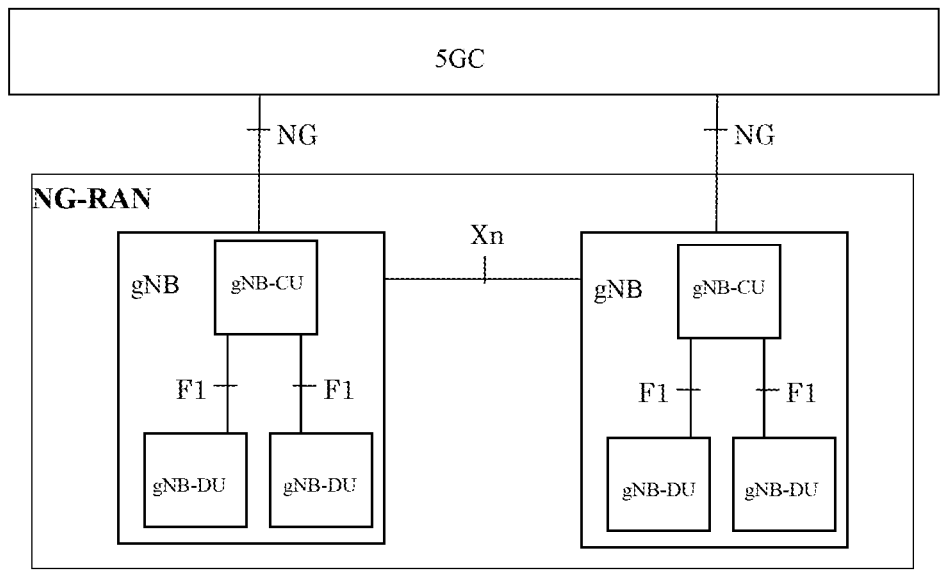
FIG. 1 is an architecture diagram of 5G NR CU-DU separated deployment (gNB centralized deployment)

FIG. 1 shows an architecture diagram of a 5G NRCU-DU separated deployment (gNB centralized deployment). The 5G user traffic data and the unbalanced user traffic physical distribution required by the different types of Quality of Service (QoS) traffic data have different requirements for network deployment and data transmission performance of the 5G network. This data traffic of different types is often interleaved, or exploded at a local hotspot area, so that the current relatively closed network architecture is unable to efficiently support various 5G communication scenarios. Therefore, on the basis of the division of the CU and the DU, the control plane (CP) entity (also referred to as the CP network element entity) and the user plane (UP) entity (also referred to as the UP network element entity) within the CU entity are physically divided into (note: a CP function set and a UP function set have been divided logically, but are physically integrated into a single base station network element) in comprehensive consideration of the transmission delay, load balance, multi-manufacturer device interoperability, deployment cost, and the like at the same time, so that the CP entity and the UP entity is able to be deployed in different geographical positions, configured independently, and subjected to resource expansion and function upgrading, thereby more flexibly and efficiently performing networking and satisfying requirements of various types of 5G traffic data. An architectural diagram of CP entity and UP entity physical separation is shown in FIG. 2.

Figure 2:
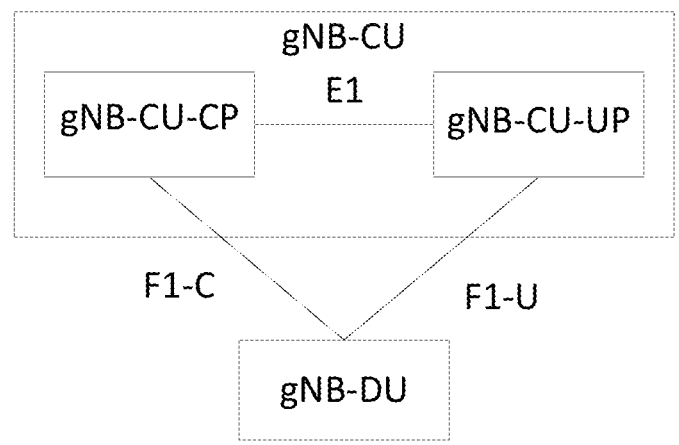
FIG. 2 is an architectural diagram of CP entity and UP entity physical separation.

Referring to FIG. 2, from the perspective of a deployment position, a CP entity may be deployed in a network central office, such as a CU entity, to simultaneously manage multiple UP entities in the jurisdiction area, so that traffic load resources among the multiple UP entities are efficiently coordinated to achieve a purpose of load balance. From the perspective of the deployment position, the CP entity may also be deployed at a position close to the DU entity on the edge of the network according to the requirements. Similarly, the UP entity may be deployed in a network database center, such as the CU entity or a core network user plane function (UPF) entity, and is simultaneously controlled to be connected to multiple CP entities to achieve sharing and reusing of a baseband resource pool within the UP entity. The UP entity may also be deployed at the position close to the DU entity on the edge of the network according to the requirements. The above various flexible deployment manners can not only enable the baseband resources in the CP entity and the UP entity to be efficiently utilized, but also greatly reduce the delay of interaction among radio resource control (RRC) control plane signaling, user traffic data and the DU entity, and thus QoS requirements of low delay traffic are sufficiently satisfied.

From the perspective of an operator, the separation of the CP entity and the UP entity can construct a more flexible and efficient network deployment manner, which can further reduce the deployment cost while satisfying various traffic requirements.

From the perspective of air interface user plane division, the CP entity includes the RRC and a packet data convergence protocol-control (PDCP-C) layer (used for PDCP processing of control plane signaling, and the UP entity includes a service data adaptation protocol (SDAP) and a packet data convergence protocol-user (PDCP-U) layer (used for PDCP processing of user plane data). A many-to-many mapping connection manner can be adopted between the CP entity and the UP entity, the CP entity can simultaneously manage multiple UP entities, and resources provided by the UP entity can be shared by the multiple CP entities.

The embodiment of the present disclosure is applicable to 5G NR or other equipotential radio systems, and relates to synchronisation of status information between the CP entity and the UP entity under a scenario of physical separation of a CP network element entity from a UP network element entity on a network radio access side. In the present disclosure, a logical interface between the CP network element entity and the UP network element entity is uniformly referred to as an E1 interface, and for a particular served UE object, the E1 interface may be configured with one or more data radio bearers (DRB) for transmitting user traffic data streams with a variety of different QoS requirements, where the user traffic data streams include downlink and uplink data streams.

An embodiment of the present disclosure provides a method for synchronizing status information between a CP entity and a UP entity that are physically separated inside a radio access network, so that the CP entity can acquire certain key status information within the UP entity in time, and thus various management and control operations of the CP entity side can be triggered.

Figure 3:
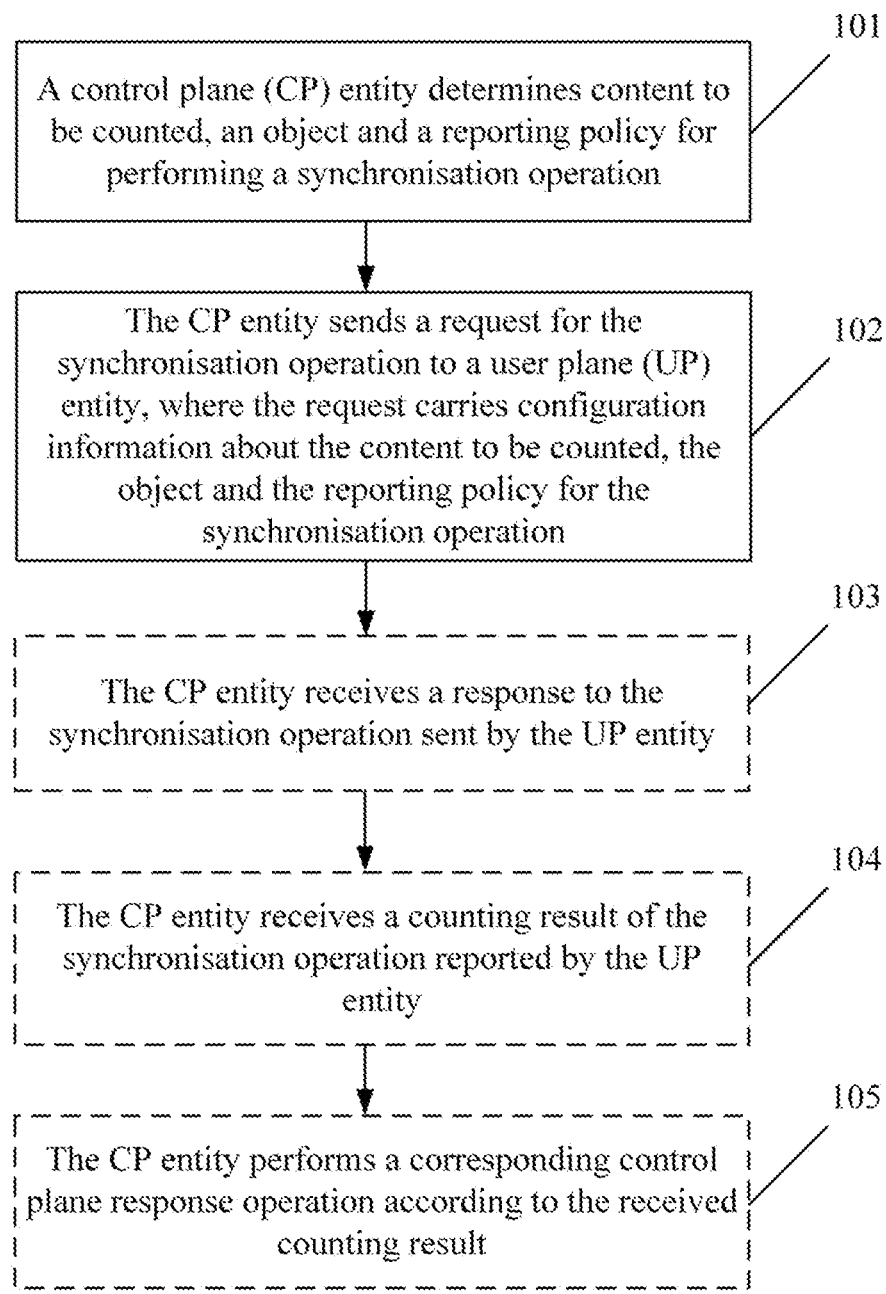
FIG. 3 is a flowchart of a synchronisation method according to an embodiment of the present disclosure (a CP entity)

As shown in FIG. 3, a synchronisation method of the embodiment of the present disclosure includes steps described below.

In step 101, a CP entity determines content to be counted, an object and a reporting policy for performing a synchronisation operation, where the synchronisation operation includes at least one of: a working status synchronisation operation or a resource status synchronisation operation.

In an embodiment, the object for performing the synchronisation operation may include at least one of: one or more DRBs, one or more protocol data unit (PDU) sessions, a UE, multiple groups of UEs or a processing unit of a designated UP entity.

For each user traffic data stream within the processing unit of the particular UP entity, Per DRB (each DRB) may be taken as a granularity object for tracking, collecting, calculating, analyzing and reporting status information, Per PDU session (each PDU session, where one PDU Session can be mapped to multiple DRBs) may also be taken as the granularity object for tracking, collecting, calculating, analyzing and reporting the status information, and a single UE or multiple groups of UEs or a processing unit of the UP entity may also be taken as the granularity object for tracking, collecting, calculating, analyzing and reporting the status information. In general, the UE and its following granularity objects relate to UE associated signaling, while the granularity objects above the UE relate to non UE associated signaling or global procedures.

A network side CP entity selects, according to the needs of a control plane, an object to perform the synchronisation operation, such as several DRBs, several PDU sessions, a single UE, several groups of UEs, and a processing unit of the designated UP entity.

In an embodiment, the configuration information about the content to be counted includes at least one of: configuration parameter information for analyzing and counting a working status of a user traffic data stream or configuration parameter information for analyzing and counting a working status and a resource status of a processing unit of the UP entity.

In an embodiment, the configuration parameter information for analyzing and counting the working status of the user traffic data stream includes at least one of: uplink and downlink transmission rate information about a traffic data stream, uplink and downlink Quality of Service information about the traffic data stream, packet data convergence protocol (PDCP) serial number (SN) information about a downlink traffic data stream, security operation information about an uplink traffic data stream or PDCP data packet recovery information about the uplink traffic data stream.

The uplink and downlink transmission rate information about the traffic data stream may include an uplink and downlink average transmission rate of the traffic data stream, a maintenance condition of the aggregated maximum bit rate (AMBR), and the like.

The uplink and downlink QoS information about the traffic data stream may include whether the uplink and downlink QoS of the traffic data stream is normally maintained, a QoS counting time window parameter, a specific QoS analysis object parameter, and the like.

The PDCP SN information about the downlink traffic data stream may include whether a PDCP SN of the downlink traffic data stream has a maximum value reversal, a current count value, and the like.

The security operation information about the uplink traffic data stream may include whether decryption failure and integrity protection check failure of the uplink traffic data stream are detected.

The PDCP data packet recovery information about the uplink traffic data stream may include whether the PDCP data packet recovery failure of the uplink traffic data stream is detected.

In an embodiment, the configuration parameter information for analyzing and counting the working status and the resource status of the processing unit of the UP entity includes at least one of: a baseband resource duty ratio of the processing unit, a baseband resource busy-idle ratio of the processing unit, fault information about the processing unit, the number of in-serving data radio bearers (DRBs) of the processing unit or the number of protocol data unit (PDU) sessions of the processing unit.

In an embodiment, in a step in which the CP entity determines the content to be counted, the object and the reporting policy for performing the synchronisation operation, an action type of the synchronisation operation is further determined, where the action type of the synchronisation operation includes at least one of: setup and start, modification and reconfiguration, or deletion and stop corresponding to initializing a configuration parameter to start the synchronisation operation, modifying the configuration parameter to continue the synchronisation operation, and deleting the configuration parameter to stop the synchronisation operation, respectively.

In step 102, the CP entity sends a request for the synchronisation operation to a user plane (UP) entity, where the request carries configuration information about the content to be counted, the object and the reporting policy for the synchronisation operation.

In the step, a corresponding UP entity may be requested and configured through an E1 interface procedure, and a selected target object is subjected to operations (referred to as the synchronisation operation) of tracking, counting, analysis, and reporting of status information.

In an embodiment, in a step in which the CP entity sends the request for the synchronisation operation to the UP entity, the request further carries configuration information about the action type.

In the embodiment of the present disclosure, the CP entity sends the request for the synchronisation operation to the UP entity, and thus status of various information content to be synchronized within the UP entity can be tracked in real time.

In an embodiment, the reporting policy includes at least one of: designated event trigger reporting, time period trigger reporting or periodic reporting triggered by a designated event.

A network side CP entity may configure a particular reporting policy (such as the designated event trigger reporting, the time period trigger reporting and the periodic reporting triggered by a designated event), and configure the UP entity to report a related result corresponding to the synchronisation operation. Some operation objects are applicable to both "event" and "time" manners, while some operation objects are merely applicable to one of the "event" or "time" manner.

In the embodiment, the CP entity may configure the UP entity to perform the synchronisation operation by means of event definition triggering, time period triggering, and event and time period triggering, and may achieve a balance between real-time of the synchronisation operation and effect efficiency overhead cost according to the real-time requirements of different information content to be synchronized.

For example, the CP entity may request to acquire the following information through the request for the synchronisation operation:

a target DBR, a target PDU session or an uplink and downlink average transmission rate of a traffic data stream with another granularity. Optionally, the information may include a rate counting time window parameter, a rate event trigger reporting threshold parameter, an UP no data transmission Inactivity status indication, and the like;

the target DBR, the target PDU session or whether uplink and downlink Quality of Service (QoS) of a traffic data stream with another granularity is normally maintained, that is, whether a Quality of Service (QoS) requirement of a user subscribed traffic data is not damaged or exceeded. Optionally, the information may include a QoS counting time window parameter, a specific QoS analysis object parameter, such as an actual average rate of guaranteed bit rates (GBRs), average delay of data packet transmission, an average packet loss rate of data packets, and the like;

whether a PDCP SN of a downlink traffic data stream of the target DRB has a maximum value reversal and a current downlink count value. Optionally, the information may include the number of reversals the PDCP SN of the downlink traffic data stream of the target DRB has been included;

whether the UP entity has detected at least one of decryption failure or integrity protection check failure of an uplink traffic data stream of the target DBR;

whether the UP entity has detected PDCP Recovery data packet recovery failure of the uplink traffic data stream of the target DRB; and the baseband resource duty radio or busy-idle ratio in a processing unit of a target UP entity, the total number of serving DRBs and PDU sessions, and the like.

In an embodiment, after the step 102, the method may further include the step described below.

In step 103, the CP entity receives a response to the synchronisation operation sent by the UP entity, where the response carries feedback information about accepting or rejecting the request, and in response to determining that the request is accepted, the response further carries feedback information about accepting all or part of the configuration information carried in the request.

The UP entity, if accepting the request, performs subsequent related operations of status tracking, counting, analysis, and reporting; and the UP entity, if rejecting the request, does not perform synchronisation operations on those objects.

It is to be noted that the acceptance here refers to the acceptance of setup and start, or modification and reconfiguration, and if the acceptance refers to the acceptance of the deletion and stop, the UP entity will not perform the related operations of status tracking, counting, analysis, and reporting.

In an embodiment, after the CP entity receives a response indicating acceptance of the synchronisation operation, the method further includes the step described below.

In step 104, the CP entity receives a counting result of the synchronisation operation reported by the UP entity.

Where, the request for the synchronisation operation, the response to the synchronisation operation and the counting result of the synchronisation operation are born through signaling of an E1 interface between the CP entity and the UP entity.

In an embodiment, the method further includes the step described below.

In step 105, the CP entity performs a corresponding control plane response operation according to the received counting result.

The CP response operation may include: performing reconfiguration adjustment on at least one of a working status or a resource status of a core network element, a base station network element, a user equipment (UE), or the UP entity.

In the step, after the CP entity receives the reported result of the UP entity, the CP entity performs a corresponding control plane response operation, such as triggering procedures related to the core network, triggering procedures related to the UP entity, triggering procedures related to the UE, and the like.

In the embodiment, a corresponding control plane response operation may be performed according to a counting result of the synchronisation operation reported by the UP entity, thereby enabling the UP entity to work more effectively and efficiently, for example, a UP resource is more reasonably utilized, data transmission on the DRB is recovered to normal in time, and a fault in the UP entity is cleared in time, etc.

Figure 4:
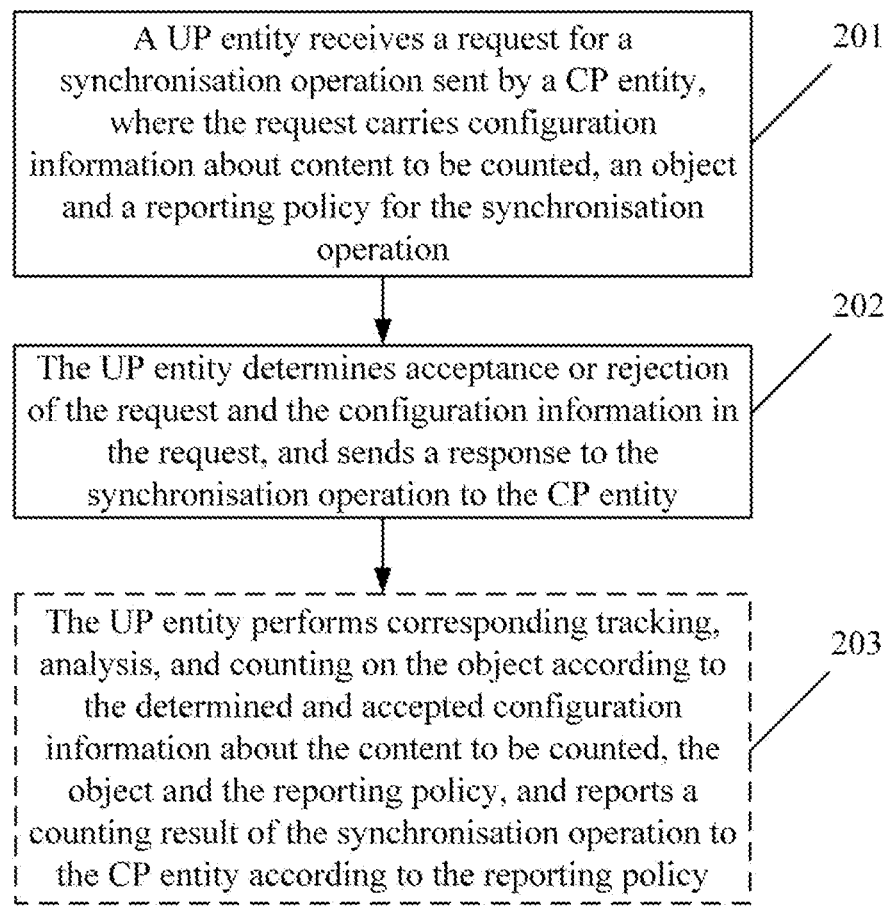
FIG. 4 is a flowchart of a synchronisation method according to an embodiment of the present disclosure (a UP entity)

As shown in FIG. 4, a synchronisation method of the embodiment of the present disclosure includes steps described below.

In step 201, an UP entity receives a request for a synchronisation operation sent by a CP entity, where the request carries configuration information about content to be counted, an object and a reporting policy for the synchronisation operation, where the synchronisation operation includes at least one of: a working status synchronisation operation or a resource status synchronisation operation.

In an embodiment, the request further carries configuration information about an action type of the synchronisation operation, and the action type of the synchronisation operation includes at least one of: setup and start, modification and reconfiguration, or deletion and stop.

In an embodiment, configuration information about the content to be counted includes at least one of: configuration parameter information for analyzing and counting a working status of a user traffic data stream or configuration parameter information for analyzing and counting a working status and a resource status of a processing unit of the UP entity.

The configuration parameter information for analyzing and counting the working status of the user traffic data stream includes at least one of: uplink and downlink transmission rate information about a traffic data stream, uplink and downlink Quality of Service information about the traffic data stream, packet data convergence protocol (PDCP) serial number information about a downlink traffic data stream, security operation information about an uplink traffic data stream or PDCP data packet recovery information about the uplink traffic data stream.

The configuration parameter information for analyzing and counting the working status and the resource status of the processing unit of the UP entity includes at least one of: a baseband resource duty ratio of the processing unit, a baseband resource busy-idle ratio of the processing unit, fault information about the processing unit, the number of serving data radio bearers (DRBs) of the processing unit or the number of protocol data unit (PDU) sessions of the processing unit.

In an embodiment, the object for implementing the synchronisation operation includes at least one of: one or more DRBs, one or more PDU sessions, one UE, multiple groups of UEs or a processing unit of the designated UP entity.

In an embodiment, the request for the synchronisation operation is at least one of a setup request, a modification request or a deletion request.

In step 202, the UP entity determines acceptance or rejection of the request and the configuration information in the request, and sends a response to the synchronisation operation to the CP entity, where the response carries feedback information about accepting or rejecting the request, and in response to determining that the request is accepted, the response further carries feedback information about accepting all or part of the configuration information carried in the request.

After the UP entity receives the request, Per DRB, Per PDU Session, Per UE, Per group of UEs, a processing unit of Per UP entity may be separately taken as a granularity object for accepting or rejecting a request for the synchronisation operation.

In an embodiment, after the UP entity determines that the request is accepted, the method further includes the step described below.

In step 203, the UP entity performs corresponding tracking, analysis, and counting on the object according to the determined accepted configuration information about the content to be counted, the object and the reporting policy, and reports a counting result of the synchronisation operation to the CP entity according to the reporting policy.

If the UP entity rejects the request, the synchronisation operations are not performed on those objects.

Acceptance here refers to the acceptance of setup and start, and modification and reconfiguration, and if the acceptance refers to the deletion and stop, the related operations of status tracking, counting, analysis, and reporting will not be performed.

In an embodiment, the reporting policy includes at least one of: designated event trigger reporting, time period trigger reporting or periodic reporting triggered by a designated event.

In the step, a network side UP entity performs tracking and counting of related content according to the request for the synchronisation operation and configuration of the CP entity, then reports a related result according to the reporting policy and a related reporting parameter configured by the CP entity, and sends a result of the synchronisation operation to the CP entity through an E1 interface procedure.

In the embodiment of the present disclosure, the CP entity sends the request for the synchronisation operation to the UP entity, and thus status of various information content to be synchronized within the UP entity can be tracked in real time. The CP entity performs a corresponding control plane response operation according to a counting result of the synchronisation operation reported by the UP entity, thereby enabling the UP entity to work more effectively and efficiently, for example, a UP resource is more reasonably utilized, data transmission on the DRB is recovered to normal in time, and a fault in the UP entity is cleared in time, etc.

Figure 5:
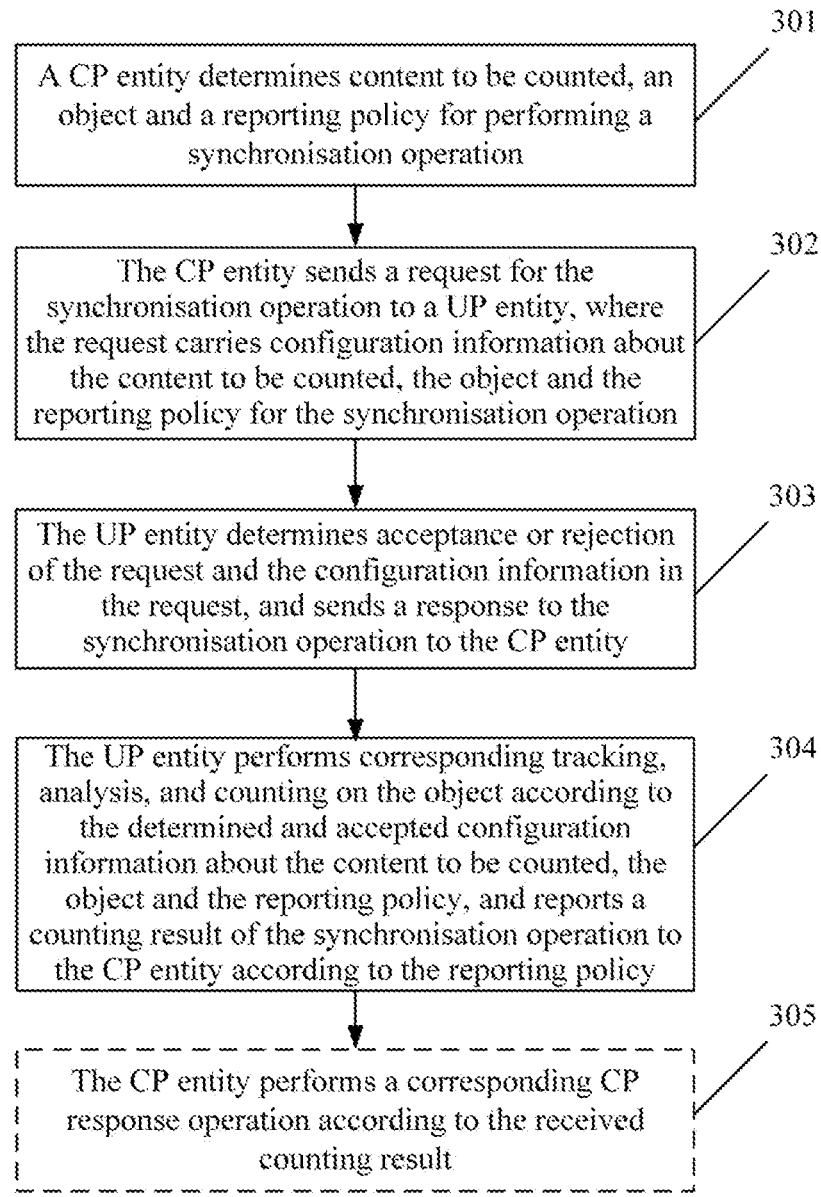
FIG. 5 is a flowchart of a synchronisation method according to an embodiment of the present disclosure (a CP entity and a UP entity)

As shown in FIG. 5, a synchronisation method of the embodiment of the present disclosure includes steps described below.

In step 301, a CP entity determines content to be counted, an object and a reporting policy for performing a synchronisation operation, where the synchronisation operation includes at least one of: a working status synchronisation operation or a resource status synchronisation operation.

In step 302, the CP entity sends a request for the synchronisation operation to a user plane (UP) entity, where the request carries configuration information about the content to be counted, the object and the reporting policy for the synchronisation operation.

In step 303, the UP entity determines acceptance or rejection of the request and the configuration information in the request, and sends a response to the synchronisation operation to the CP entity, where the response carries feedback information about accepting or rejecting the request, and in response to determining that the request is accepted, the response further carries feedback information about accepting all or part of the configuration information carried in the request.

In an embodiment, after the UP entity determines that the request is accepted, the method further includes the step described below.

In step 304, the UP entity performs corresponding tracking, analysis, and counting on the object according to the determined accepted configuration information about the content to be counted, the object and the reporting policy, and reports a counting result of the synchronisation operation to the CP entity according to the reporting policy.

In an embodiment, after the UP entity reports the counting result of the synchronisation operation to the CP entity, the method further includes the step described below.

In step 305, the CP entity performs a corresponding CP response operation according to the received counting result.

In the embodiment of the present disclosure, the CP entity sends the request for the synchronisation operation to the UP entity, and thus status of various information content to be synchronized within the UP entity can be tracked in real time. The CP entity performs a corresponding control plane response operation according to a counting result of the synchronisation operation reported by the UP entity, thereby enabling the UP entity to work more effectively and efficiently, for example, a UP resource is more reasonably utilized, data transmission on the DRB is recovered to normal in time, and a fault in the UP entity is cleared in time, etc.

Figure 6:
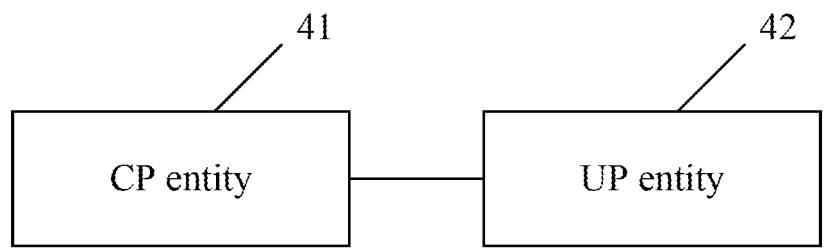
FIG. 6 is a schematic diagram of a synchronisation system according to an embodiment of the present disclosure.

As shown in FIG. 6, a synchronisation system of the embodiment of the present disclosure includes a CP entity 41 and a UP entity 42.

The CP entity 41 of the embodiment of the present disclosure includes a memory, a processor, and computer programs stored in the memory and executable on the processor, where when the processor executes the computer programs, the processor implements the following steps.

Content to be calculated, an object and a reporting policy for performing a synchronisation operation are determined, where the synchronisation operation includes at least one of: a working status synchronisation operation or a resource status synchronisation operation.

A request for the synchronisation operation is sent to a user plane (UP) entity, where the request carries configuration information about the content to be counted, the object and the reporting policy for the synchronisation operation.

In an embodiment, the processor, when executing the programs, further implements a step described below.

In the step in which the content to be counted, the object and the reporting policy for performing the synchronisation operation are determined, an action type of the synchronisation operation is further determined, where the action type of the synchronisation operation includes at least one of: setup and start, modification and reconfiguration, or deletion and stop.

The request further carries configuration information about the action type.

In an embodiment, after the request for the synchronisation operation is sent to the UP entity, the processor, when executing the programs, further implements a step described below.

A response to the synchronisation operation sent by the UP entity is received, where the response carries feedback information about accepting or rejecting the request, and in response to determining that the request is accepted, feedback information about accepting all or part of the configuration information carried in the request is further carried.

In an embodiment, after a response indicating acceptance of the synchronisation operation is received, the processor, when executing the programs, further implements a step described below.

A counting result of the synchronisation operation reported by the UP entity is received.

In an embodiment, after the counting result of the synchronisation operation reported by the UP entity is received, the processor, when executing the programs, further implements a step described below.

A corresponding CP response operation is performed according to the received counting result.

The UP entity 42 of the embodiment of the present disclosure includes a memory, a processor, and computer programs stored in the memory and executable on the processor, where when the processor executes the computer programs, the processor implements the following steps.

A request for the synchronisation operation sent by the CP entity is received, where the request carries configuration information about the content to be counted, the object and the reporting policy for the synchronisation operation, where the synchronisation operation includes at least one of: a working status synchronisation operation or a resource status synchronisation operation.

Acceptance or rejection of the request and the configuration information in the request is determined, and a response to the synchronisation operation is sent to the CP entity, where the response carries feedback information about accepting or rejecting the request, and in response to determining that the request is accepted, the response further carries feedback information about accepting all or part of the configuration information carried in the request.

In an embodiment, the request further carries configuration information about an action type of the synchronisation operation, and the action type of the synchronisation operation includes at least one of: setup and start, modification and reconfiguration, or deletion and stop.

In an embodiment, after the UP entity determines that the request is accepted, the processor, when executing the programs, further implements a step described below.

Corresponding tracking, analysis, and counting are performed on the object according to the determined accepted configuration information about the content to be counted, the object and the reporting policy, and a counting result of the synchronisation operation is reported to the CP entity according to the reporting policy.

In the embodiment of the present disclosure, the CP entity sends the request for the synchronisation operation to the UP entity, and thus status of various information content to be synchronized within the UP entity can be tracked in real time. The CP entity performs a corresponding control plane response operation according to a counting result of the synchronisation operation reported by the UP entity, thereby enabling the UP entity to work more effectively and efficiently, for example, a UP resource is more reasonably utilized, data transmission on the DRB is recovered to normal in time, and a fault in the UP entity is cleared in time, etc.

Figure 7:
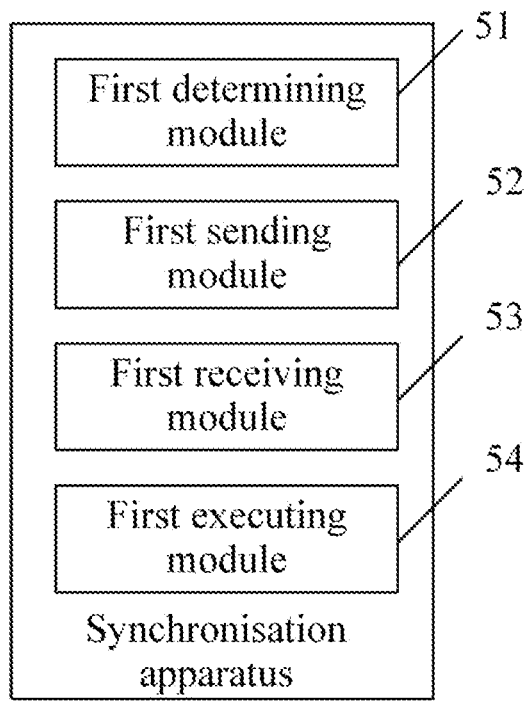
FIG. 7 is a schematic diagram of a synchronisation apparatus according to an embodiment of the present disclosure.

As shown in FIG. 7, a synchronisation apparatus of the embodiment of the present disclosure includes a first determining module 51 and a first sending module 52.

The first determining module 51 is configured to determine content to be counted, an object and a reporting policy for performing a synchronisation operation, where the synchronisation operation includes at least one of: a working status synchronisation operation or a resource status synchronisation operation.

The first sending module 52 is configured to send a request for the synchronisation operation to a user plane (UP) entity, where the request carries configuration information about the content to be counted, the object and the reporting policy for the synchronisation operation.

In an embodiment, the first determining module 51 is further configured to determine an action type of the synchronisation operation, where the action type of the synchronisation operation includes at least one of: setup and start, modification and reconfiguration, or deletion and stop.

The request further carries configuration information about the action type.

In an embodiment, the apparatus further includes a first receiving module 53.

The first receiving module 53 is configured to receive a response to the synchronisation operation sent by the UP entity, where the response carries feedback information about accepting or rejecting the request, and in response to determining that the request is accepted, the response further carries feedback information about accepting all or part of the configuration information carried in the request.

In an embodiment, the first receiving module 53 is further configured to receive a counting result of the synchronisation operation reported by the UP entity.

In an embodiment, the apparatus further includes a first executing module 54.

The first executing module 54 is configured to perform a corresponding control plane response operation according to the received counting result.

In the embodiment of the present disclosure, the request for the synchronisation operation is sent to the UP entity, and thus status of various information content to be synchronized within the UP entity can be tracked in real time. The CP entity performs a corresponding control plane response operation according to a counting result of the synchronisation operation reported by the UP entity, thereby enabling the UP entity to work more effectively and efficiently, for example, a UP resource is more reasonably utilized, data transmission on the DRB is recovered to normal in time, and a fault in the UP entity is cleared in time, etc.

Figure 8:
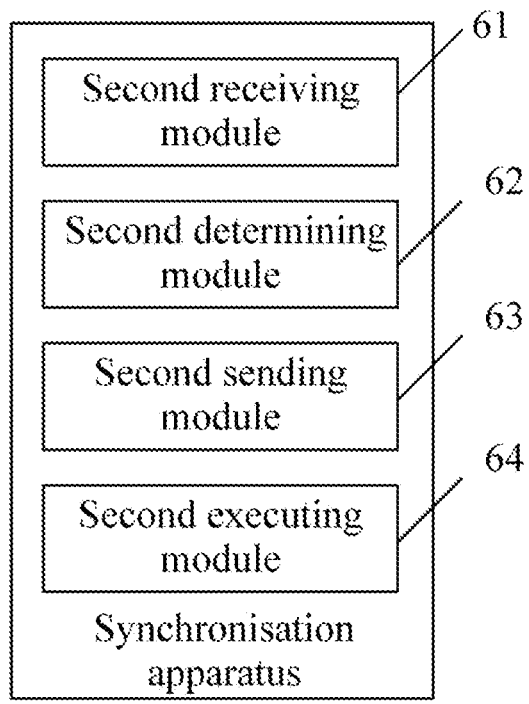
FIG. 8 is a schematic diagram of a synchronisation apparatus according to an embodiment of the present disclosure.

As shown in FIG. 8, a synchronisation apparatus of the embodiment of the present disclosure includes a second receiving module 61, a second determining module 62 and a second sending module 63.

The second receiving module 61 is configured to receive a request for a synchronisation operation sent by a CP entity, where the request carries configuration information about content to be counted, an object and a reporting policy for the synchronisation operation, where the synchronisation operation includes at least one of: a working status synchronisation operation or a resource status synchronisation operation.

The second determining module 62 is configured to determine acceptance or rejection of the request and the configuration information in the request.

The second sending module 63 is configured to send, according to a decision of a determining module, a response to the synchronisation operation to the CP entity, where the response carries feedback information about accepting or rejecting the request, and in response to determining that the request is accepted, the response further carries feedback information about accepting all or part of the configuration information carried in the request.

In an embodiment, the apparatus further includes a second executing module 64.

The second executing module 64 is configured to perform, after the request is determined to be accepted, corresponding tracking, analysis, and counting on the object according to the determined accepted configuration information about the content to be counted, the object and the reporting policy.

The second sending module 63 is further configured to report a counting result of the synchronisation operation to the CP entity according to the reporting policy.

In the embodiment of the present disclosure, the CP entity sends the request for the synchronisation operation to the UP entity, and thus status of various information content to be synchronized within the UP entity can be tracked in real time. The CP entity performs a corresponding control plane response operation according to a counting result of the synchronisation operation reported by the UP entity, thereby enabling the UP entity to work more effectively and efficiently, for example, a UP resource is more reasonably utilized, data transmission on the DRB is recovered to normal in time, and a fault in the UP entity is cleared in time, etc.

Described below are several application examples. It is worth noting that the application example numbers are merely used to distinguish the application examples, and are not necessarily used to represent a priority order.

Application Example One

Figure 9:
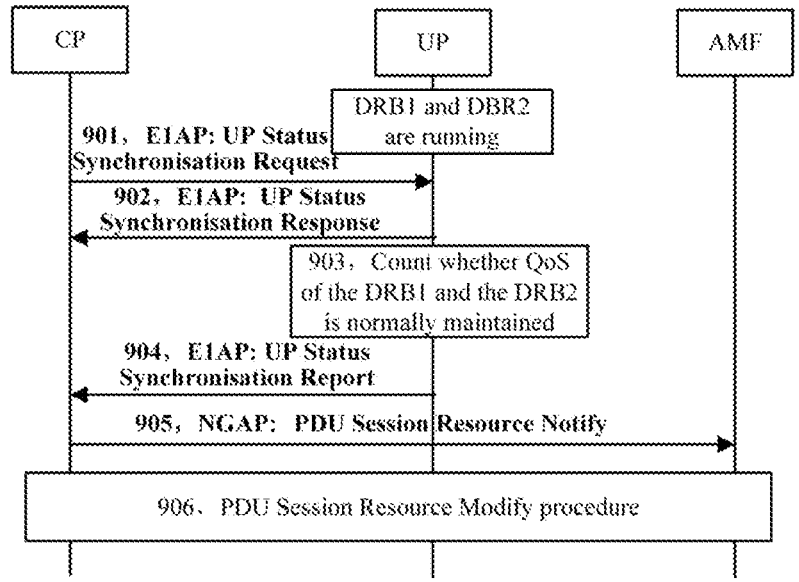
FIG. 9 is a flowchart of application example one according to an embodiment of the present disclosure.

At some time, UE1 is configured with two DRBs with a GBR traffic attribute, where the two DRBs are DRB1 and DRB2 used for bearing a voice data transmission traffic and a video data transmission traffic, respectively, and a network side CP entity and a network side UP entity support content of the embodiment of the present disclosure, and may perform a synchronisation operation with the DRB as the granularity. FIG. 9 is a flowchart of application example one.

In step 901, a network side CP entity requests a synchronisation operation from a UP entity through an E1 interface procedure message, i.e., UP Status Synchronisation Request, operation objects are the DRB1 and the DRB2 in the UE1, content to be synchronized is whether uplink and downlink Quality of Service (QoS) of a traffic data stream is normally performed and maintained, and optional parameters are as follows: a length of a QoS counting time window is equal to 10 s, and GBR actual average rate is counted periodically. In a case where the GBR actual average rate of the DRB1 and the GBR actual average rate of the DRB2 each are smaller than the GBR subscription requirement rate, a QoS compromised identification of the DRB is recorded; in a case where QoS is compromised for three times consecutively, the UP entity reports the related result in an event manner.

In step 902, the UP entity receives and accepts the synchronisation operation request and related parameter configuration of the CP entity for the DRB1 and the DRB2 in the UE1, and replies to the CP entity with "the synchronisation operation request and the configuration parameter each have been accepted" through the E1 interface procedure message, i.e., UP status synchronisation response.

In step 903, the UP entity will periodically count and record the GBR actual average rate in units of 10 s as the length of a QoS counting time window, and the GBR actual average rate is compared with the GBR subscription requirement rate to obtain "QoS compromised identification strings" of the DRB1 and the DRB2 respectively, such as { . . . normal, compromised, normal, compromised, compromised, compromised}.

In step 904, according to the reporting policy and the parameter previously configured by the CP entity, in a case where QoS is compromised for three times consecutively, the UP entity reports an event that "QoS of a certain DRB is compromised" to the CP entity through the E1 interface procedure message, i.e., UP Status Synchronisation Report, and optionally, "QoS compromised identification strings' information may be reported.

In step 905, the CP entity knows, through the content reported by the UP entity, that the QoS of the DRB1 is consecutively compromised, and that QoS experience of user voice data traffic is reduced, and then the CP entity notifies an access and mobility control function (AMF) of a related condition through an NGAP procedure message, i.e., PDU Session Resource Notify.

In step 906, the AMF triggers a PDU Session Resource Modify procedure according to the content reported by the CP entity, and modifies PDU Session attribute content associated with the DRB1, for example, a video traffic data stream is released.

Application Example Two

Figure 10:
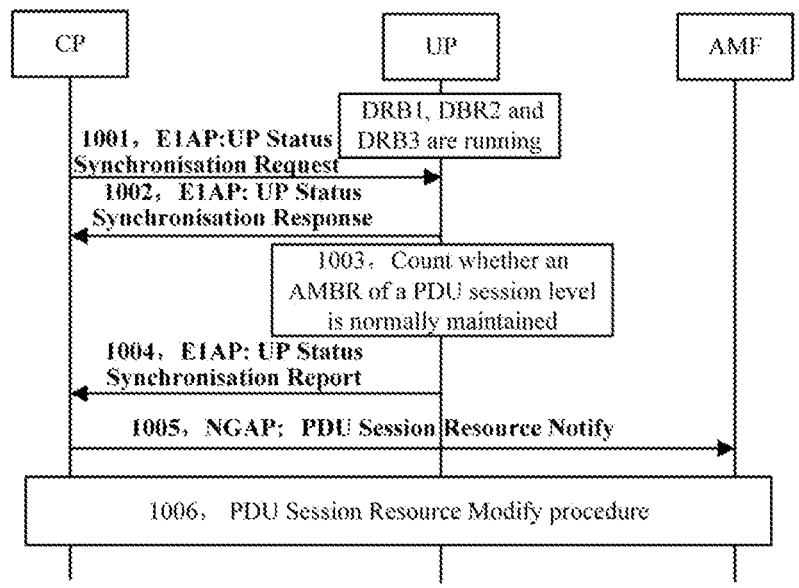
FIG. 10 is a flowchart of application example two according to an embodiment of the present disclosure.

At some time, UE2 is configured with three DRBs with a GBR traffic attribute, where the three DRBs are DRB1, DRB2 and DRB3 used for bearing and transmitting different file block objects respectively, and belonging to a same PDU Session. A network side CP entity and a network side UP entity support content of the embodiment of the present disclosure, and may perform a synchronisation operation with the PDU Session as the granularity. FIG. 10 is a flowchart of application example two.

In step 1001, the network side CP entity requests the synchronisation operation from a UP entity through an E1 interface procedure message, i.e., UP Status Synchronisation Request, an operation object is PDU Session1 (mapped into the DRB1, the DRB2 and the DRB3) in the UE1, content to be synchronized is whether the AMBR of a PDU Session level is normally performed and maintained, and optional parameters are as follows: a length of an AMBR counting time window is equal to 20 s, and AMBR actual average rate is counted periodically. In a case where the AMBR actual average rate of the DRB1, the DRB2 and the DRB3 is greater than AMBR subscription requirement rate, a limit exceeding identification of the PDU Session AMBR is recorded; in a case where the first AMBR limit exceeding identification appears, the UP entity reports a related result in an event manner.

In step 1002, the UP entity receives and accepts the synchronisation operation request and related parameter configuration of the CP entity for the PDU Session1 in the UE2, and replies to the CP entity with "the synchronisation operation request and the configuration parameter each have been accepted" through the E1 interface procedure message, i.e., UP Status Synchronisation Response.

In step 1003, the UP entity will periodically count and record the AMBR actual average rate in units of 20 s as the length of an AMBR counting time window, and the AMBR actual average rate is compared with the AMBR subscription requirement rate to obtain a "history identification string" of the PDU Session1 AMBR, such as { . . . normal, normal, normal, limit exceeding}.

In step 1004, according to the reporting policy and the parameter previously configured by the CP entity, in a case where the first AMBR limit exceeding identification appears, the UP entity reports an event that "the PDU Session1 AMBR exceeds the limit" to the CP entity through the E1 interface procedure message, i.e., UP Status Synchronisation Report.

In step 1005, the CP entity knows, through the content reported by the UP entity, that the PDU Session1 AMBR exceeds the limit, and that the QoS of the user's file download traffic exceeds the subscription limit, and then the CP entity notifies the AMF of a related condition through an NGAP procedure message, i.e., PDU Session Resource Notify.

In step 1006, the AMF triggers a PDU Session Resource Modify procedure according to the content reported by the CP entity, and modifies PDU Session1 attribute content, for example, some QoS Flow data streams in the PDU Session1 is released.

Application Example Three

Figure 11:
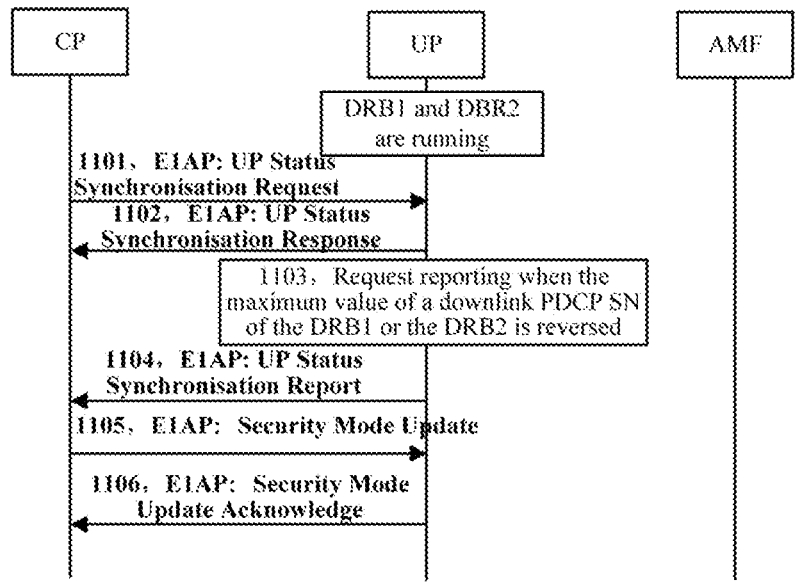
FIG. 11 is a flowchart of application example three according to an embodiment of the present disclosure.

At some time, UE3 is configured with two DRBs with a Non GBR traffic attribute, where the two DRBs are DRB1 and DRB2 used for bearing a transmission of web browsing data traffic and a transmission of online audio data traffic, respectively, and belonging to a same PDU session. A network side CP entity and a network side UP entity support content of the embodiment of the present disclosure, and may perform a synchronisation operation with the DRB session as the granularity. FIG. 11 is a flowchart of application example three.

In step 1101, the network side CP entity requests the synchronisation operation from a UP entity through an E1 interface procedure message, i.e., UP Status Synchronisation Request, operation objects are the DRB1 and the DRB2 in the UE1, and content to be synchronized is as follows: in a case where for a certain DRB, the maximum value of the downlink PDCP SN is about to be reversed, the UP entity reports the related result in an event manner.

In step 1102, the UP entity receives and accepts the synchronisation operation request and related parameter configuration of the CP entity for the DRB1 and the DRB2 in the UE3, and replies to the CP entity with "the synchronisation operation request and the configuration parameter each have been accepted" through the E1 interface procedure message, i.e., UP Status Synchronisation Response.

In step 1103, as downlink data blocks born in the DRB1 and the DRB2 are continuously transmitted, the respective SN (serial number) of the downlink PDCP entity is progressively increased by 1; at some time, the downlink PDCP SN corresponding to the DRB2 reaches the maximum value, the SN is about to be reversed and reset back to 0, and the UP entity suspends downlink data transmission on the DRB2.

In step 1104, according to the reporting policy and the parameter previously configured by the CP entity, in a case where for a certain DRB, the maximum value of the downlink PDCP SN is about to be reversed, the UP entity reports an event that "the maximum value of the downlink PDCP SN of the DBR2 is about to be reversed" to the CP entity through the E1 interface procedure message, i.e., UP status Synchronisation Report.

In step 1105, the CP entity knows, through the content reported by the UP entity, that the maximum value of the downlink PDCP SN of the DRB2 is about to be reversed, then the security sub-key (including encryption and integrity protection) of the bearer needs to be updated (a Key Refresh process), and then a new security sub-key is generated and configured for the UE3 in the UP entity through an E1AP procedure message, i.e., Security Mode Update. The CP entity further needs to configure the new security sub-key for the UE3 through an air interface message procedure, i.e., RRC Connection Reconfiguration, to keep consistent with the security operation related configuration of the UP entity side.

In step 1106, the UP entity configures and applies the new security sub-key to the DRB2 in the UE3 according to new security parameter configuration sent by the CP entity and returns an acknowledgement to notify the CP entity through an E1AP procedure message, i.e., Security Mode Update Acknowledge. Then, the UP entity recovers downlink data security transmission in the DRB2 based on the new security sub-key, encrypts a downlink data packet with a new encryption key, and performs an integrity protection operation on the downlink data packet with a new integrity protection key.

Application Example Four

Figure 12:
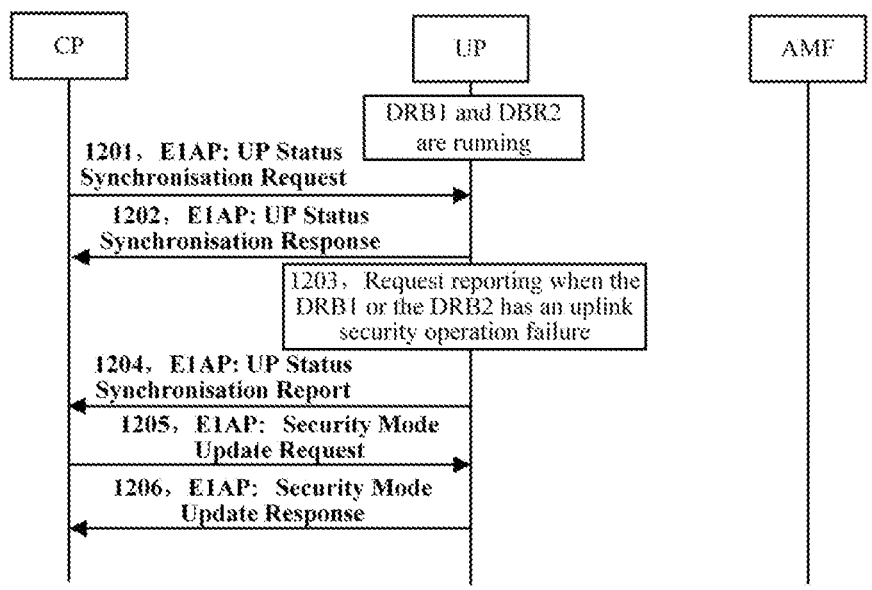
FIG. 12 is a flowchart of application example four according to an embodiment of the present disclosure.

At some time, UE4 is configured with two DRBs with a GBR traffic attribute, where the two DRBs are DRB 1 and DRB 2 used for bearing a transmission of uplink file block traffic and a transmission of local cloud disk backup traffic, respectively, and belonging to different PDU Sessions. A network side CP entity and a UP entity support content of the embodiment of the present disclosure, and may perform a synchronisation operation with the DRB session as the granularity. FIG. 12 is a flowchart of application example four.

In step 1201, the network side CP entity requests the synchronisation operation from a UP entity through an E1 interface procedure message, i.e., UP Status Synchronisation Request, operation objects are the DRB1 and the DRB2 in the UE1, and content to be synchronized is as follows: in a case where a certain DRB has an uplink security operation failure (at least one of decryption failure or integrity protection check failure), the UP entity reports the related result in an event manner.

In step 1202, the UP entity receives and accepts the synchronisation operation request and related parameter configuration of the CP entity for the DRB1 and the DRB2 in the UE4, and replies to the CP entity with "the synchronisation operation request and the configuration parameter each have been accepted" through the E1 interface procedure message, i.e., UP Status Synchronisation Response.

In step 1203, during the continuous transmission process of the uplink data blocks born in the DRB1 and the DRB2, a hacker performs malicious attacks on an uplink radio link between the UE4 and the UP entity for a certain period of time, and continuous "false data packets" are forcibly inserted into an uplink, after the UP entity receives these "false data packets", an integrity protection check error occurring on the DRB2 is detected; and then the UP entity suspends reception of uplink data on the DRB2 to avoid receiving more "false packets", but at the same time, some "true packets" from the UE4 may be missed.

In step 1204, according to the reporting policy and the parameter previously configured by the CP entity, in a case where a certain DRB has an uplink security operation failure, the UP entity reports an event that "the integrity protection check error on the DRB2 is detected" to the CP entity through the E1 interface procedure message, i.e., UP Status Synchronisation Report.

In step 1205, the CP entity knows, through the content reported by the UP entity, that the integrity protection check error on the DRB2 is detected by the DRB2, then a new security sub-key is generated and configured for the UE4 in the UP entity through an E1AP procedure message, i.e., Security Mode Update Request, and requires an attempt to recover previously lost uplink true data packets. The CP entity further needs to configure the new security sub-key for the UE4 through an air interface message procedure, i.e., RRC Connection Reconfiguration, to keep consistent with the security operation related configuration of the UP entity side.

In step 1206, the UP entity configures and applies the new security sub-key to the DRB2 in the UE4 according to new security parameter configuration sent by the CP entity, and returns to notify the CP entity through the E1AP procedure message, i.e., Security Mode Update Response, of the agreement upon the attempt to recover previously lost uplink data packets. Then the UP entity recovers the uplink data transmission on the DRB2 based on the new security sub-key, and attempts to recover the previously lost uplink true data packets.

Application Example Five

Figure 13:
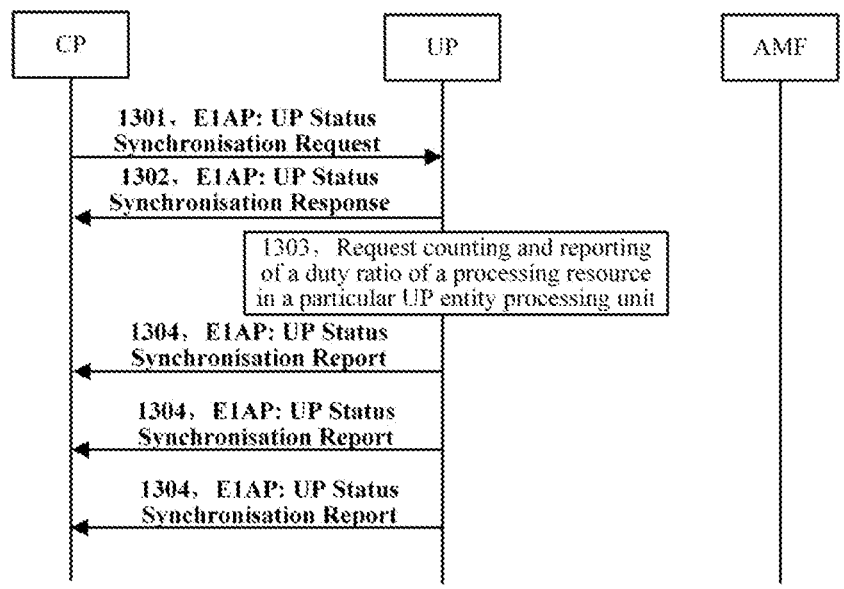
FIG. 13 is a flowchart of application example five according to an embodiment of the present disclosure.

At some time, a processing unit of a certain UP entity is bearing transmission services of different types of traffic data of many UEs. A network side CP entity and a UP entity support content of the embodiment of the present disclosure, and may perform a synchronisation operation with a processing unit of the UP entity as the granularity. FIG. 13 is a flowchart of application example five.

In step 1301, the network side CP entity requests the synchronisation operation from a UP entity through an E1 interface procedure message, i.e., UP Status Synchronisation Request, an operation object is a particular UP entity processing unit, and content to be synchronized is to count and calculate a processing resource duty ratio (that is, a ratio of average occupied and used resources to the total amount of resources) of a processing unit of a particular UP entity, and optional parameters are as follows: a length of a duty ratio counting time window is equal to 60 s, and the UP entity reports a related counting result in a periodic manner.

In step 1302, the UP entity receives and accepts the synchronisation operation request and related parameter configuration of the CP entity for the processing unit of the particular UP entity, and replies to the CP entity with "the synchronisation operation request and the configuration parameter each have been accepted" through the E1 interface procedure message, i.e., UP Status Synchronisation Response.

In step 1303, in the serving process of bearing data transmission of different traffic types of many UEs, the UP entity periodically and continuously counts and calculates the processing resource duty ratio in the processing unit of the particular UP entity, and 60 s is a counting and calculation reporting period, and thus a history record table on a time axis is obtained, such as {60%, 70%, 80%, 75%, 78%, 82% . . . }, where 60% represents that in a last counting observation window, the processing resource in the processing unit of the UP entity averagely occupies and consumes 60% of the total amount.

In step 1304, according to the reporting policy and the parameter previously configured by the CP entity, the UP entity reports the counting and calculation result to the CP entity with 60 s as a period through the E1 interface procedure message, i.e., UP Status Synchronisation Report, so that the CP entity can learn a real-time condition of overhead of the processing resource of the UP entity side.

An embodiment of the present disclosure further provides a computer-readable storage medium, which is configured to store computer-executable instructions for executing the synchronisation method as shown in FIG. 3.

An embodiment of the present disclosure further provides a computer-readable storage medium, which is configured to store computer-executable instructions for executing the synchronisation method as shown in FIG. 4.

An embodiment of the present disclosure further provides a computer-readable storage medium, which is configured to store computer-executable instructions for executing the synchronisation method as shown in FIG. 5.

In the embodiment, the storage medium may include, but is not limited to, a USB flash disk, a read-only memory (ROM), a random access memory (RAM), a mobile hard disk, a magnetic disk, an optical disk or another medium capable of storing the program codes.

In some embodiments, the computer-readable storage media described above are non-transitory storage medium.

An embodiment further provides a network element. The network element includes a transceiver, a memory and a processor.

The transceiver may be a communication interface of the network element, such as an interface between a CP entity and a UP entity.

The processor may include various storage media.

The processor is connected to the transceiver and the memory separately, and configured to control information transceiving of the transceiver and information storage of the memory by executing computer-executable instructions and to implement the synchronisation method executed by the CP entity or the UP entity, such as one or more of the synchronisation methods shown in FIGS. 3 to 5 and 9 to 13.

The processor may be any type of processor, such as a central processer, a microprocessor, a digital signal processor, a programmable array or an application specific integrated circuit, and the like.

The processor may be connected to the transceiver and the memory via a bus interface such as an integrated circuit bus interface.

Apparently, it is to be understood by those skilled in the art that the above-mentioned modules or steps of the embodiments of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the embodiments of the present disclosure are not limited to any particular combination of hardware and software.

Although the implementation modes disclosed by the embodiments of the present disclosure are as described above, the content thereof is merely implementation modes for facilitating the understanding of the embodiments of the present disclosure and is not intended to limit the present disclosure. Any person skilled in the art to which the present disclosure pertains may make any modifications and changes in the form of implementation and details without departing from the spirit and scope disclosed by the present disclosure, but the protection scope of the present patent is still subject to the scope defined by the appended claims.

What is claimed is:

1. A synchronisation method, comprising:
   determining, by a control plane (CP) entity, content to be counted, an object and a reporting policy for performing a synchronisation operation, wherein the synchronisation operation comprises at least one of a working status synchronisation operation or a resource status synchronisation operation, the object for performing the synchronisation operation comprises at least one of one or more DRBs, one or more PDU sessions, a UE, a plurality groups of UEs or a processing unit of a designated UP entity, and the reporting policy comprises at least one of: designated event trigger reporting, time period trigger reporting or periodic reporting triggered by a designated event; and
   sending, by the CP entity, a request for the synchronisation operation to a user plane (UP) entity, wherein the request carries configuration information about the content to be counted, the object and the reporting policy for the synchronisation operation;
   wherein the configuration information about the content to be counted comprises at least one of:
   configuration parameter information for analyzing and counting a working status of a user traffic data stream, which comprises at least one of: uplink and downlink transmission rate information about a traffic data stream, uplink and downlink Quality of Service information about the traffic data stream, packet data convergence protocol (PDCP) serial number information about a downlink traffic data stream, security operation information about an uplink traffic data stream or PDCP data packet recovery information about the uplink traffic data stream; or
   configuration parameter information for analyzing and counting a working status and a resource status of a processing unit of the UP entity, which comprises at least one of: a baseband resource duty ratio of the processing unit, a baseband resource busy-idle ratio of the processing unit, fault information about the processing unit, a number of in-serving data radio bearers (DRBs) of the processing unit or a number of protocol data unit (PDU) sessions of the processing unit.

2. The method of claim 1, wherein
   in the step of determining, by the CP entity, the content to be counted, the object and the reporting policy for performing the synchronisation operation, an action type of the synchronisation operation is further determined, wherein the action type of the synchronisation operation comprises at least one of: setup and start, modification and reconfiguration, or deletion and stop; and
   in the step of sending, by the CP entity, the request for the synchronisation operation to the UP entity, the request further carries configuration information about the action type.

3. The method of claim 1, wherein after sending, by the CP entity, the request for the synchronisation operation to the UP entity, the method further comprises:
   receiving, by the CP entity, a response to the synchronisation operation sent by the UP entity, wherein the response carries feedback information about accepting or rejecting the request, and
   in response to determining that the request is accepted, the response further carries feedback information about accepting all or part of the configuration information carried in the request.

4. The method of claim 3, wherein after receiving, by the CP entity, a response indicating acceptance of the synchronisation operation, the method further comprises:

receiving, by the CP entity, a counting result of the synchronisation operation reported by the UP entity.

5. The method of claim 4, wherein after receiving, by the CP entity, the counting result of the synchronisation operation reported by the UP entity, the method further comprises:
performing, by the CP entity, a corresponding CP response operation according to the received counting result.

6. The method of claim 5, wherein the CP response operation comprises:
performing reconfiguration adjustment on at least one of a working status or a resource status of a core network element, a base station network element, a user equipment (UE), or the UP entity.

7. The method of claim 4, wherein the request for the synchronisation operation, the response to the synchronisation operation and the counting result of the synchronisation operation are born through signaling of an E1 interface between the CP entity and the UP entity.

8. A synchronisation method, comprising:
receiving, by an user plane (UP) entity, a request for a synchronisation operation sent by a control plane (CP) entity, wherein the request carries configuration information about content to be counted, an object and a reporting policy for the synchronisation operation; wherein the synchronisation operation comprises at least one of a working status synchronisation operation or a resource status synchronisation operation, the object for performing the synchronisation operation comprises at least one of one or more DRBs, one or more PDU sessions, a UE, a plurality groups of UEs or a processing unit of a designated UP entity, and the reporting policy comprises at least one of: designated event trigger reporting, time period trigger reporting or periodic reporting triggered by a designated event; and
determining, by the UP entity, acceptance or rejection of the request and the configuration information in the request and sending a response to the synchronisation operation to the CP entity, wherein the response carries feedback information about accepting or rejecting the request, and in response to determining that the request is accepted, the response further carries feedback information about accepting all or part of the configuration information carried in the request;
wherein the configuration information about the content to be counted comprises at least one of:
configuration parameter information for analyzing and counting a working status of a user traffic data stream, which comprises at least one of: uplink and downlink transmission rate information about a traffic data stream, uplink and downlink Quality of Service information about the traffic data stream, packet data convergence protocol (PDCP) serial number information about a downlink traffic data stream, security operation information about an uplink traffic data stream or PDCP data packet recovery information about the uplink traffic data stream; or
configuration parameter information for analyzing and counting a working status and a resource status of a processing unit of the UP entity, which comprises at least one of: a baseband resource duty ratio of the processing unit, a baseband resource busy-idle ratio of the processing unit, fault information about the processing unit, a number of in-serving data radio bearers (DRBs) of the processing unit or a number of protocol data unit (PDU) sessions of the processing unit.

9. The method of claim 8, wherein the request further carries configuration information about an action type of the synchronisation operation, and the action type of the synchronisation operation comprises at least one of: setup and start, modification and reconfiguration, or deletion and stop.

10. The method of claim 8, wherein after the UP entity determines that the request and the configuration information in the request are accepted, the method further comprises:
performing, by the UP entity, corresponding tracking, analysis, and counting on the object according to the determined and accepted configuration information about the content to be counted, the object and the reporting policy, and reporting a counting result of the synchronisation operation to the CP entity according to the reporting policy.

11. A synchronisation apparatus, comprising a processor and a memory for storing execution instructions that when executed by the processor cause the processor to perform steps in following modules:
a first determining module, which is configured to determine content to be counted, an object and a reporting policy for performing a synchronisation operation, wherein the synchronisation operation comprises at least one of a working status synchronisation operation or a resource status synchronisation operation, the object for performing the synchronisation operation comprises at least one of one or more DRBs, one or more PDU sessions, a UE, a plurality groups of UEs or a processing unit of a designated UP entity, and the reporting policy comprises at least one of: designated event trigger reporting, time period trigger reporting or periodic reporting triggered by a designated event; and
a first sending module, which is configured to send a request for the synchronisation operation to a user plane (UP) entity, wherein the request carries configuration information about the content to be counted, the object and the reporting policy for the synchronisation operation;
wherein the configuration information about the content to be counted comprises at least one of:
configuration parameter information for analyzing and counting a working status of a user traffic data stream, which comprises at least one of: uplink and downlink transmission rate information about a traffic data stream, uplink and downlink Quality of Service information about the traffic data stream, packet data convergence protocol (PDCP) serial number information about a downlink traffic data stream, security operation information about an uplink traffic data stream or PDCP data packet recovery information about the uplink traffic data stream; or
configuration parameter information for analyzing and counting a working status and a resource status of a processing unit of the UP entity, which comprises at least one of: a baseband resource duty ratio of the processing unit, a baseband resource busy-idle ratio of the processing unit, fault information about the processing unit, a number of in-serving data radio bearers (DRBs) of the processing unit or a number of protocol data unit (PDU) sessions of the processing unit.

12. A synchronisation apparatus, comprising a processor and a memory for storing executable instructions that when executed by the processor cause the processor to perform the steps of:
receiving, by an user plane (UP) entity, a request for a synchronisation operation sent by a control plane (CP)

entity, wherein the request carries configuration information about content to be counted, an object and a reporting policy for the synchronisation operation; wherein the synchronisation operation comprises at least one of a working status synchronisation operation or a resource status synchronisation operation, the object for performing the synchronisation operation comprises at least one of one or more DRBs, one or more PDU sessions, a UE, a plurality groups of UEs or a processing unit of a designated UP entity, and the reporting policy comprises at least one of: designated event trigger reporting, time period trigger reporting or periodic reporting triggered by a designated event; and determining, by the UP entity, acceptance or rejection of the request and the configuration information in the request and sending a response to the synchronisation operation to the CP entity, wherein the response carries feedback information about accepting or rejecting the request, and in response to determining that the request is accepted, the response further carries feedback information about accepting all or part of the configuration information carried in the request;

wherein the configuration information about the content to be counted comprises at least one of:

configuration parameter information for analyzing and counting a working status of a user traffic data stream, which comprises at least one of: uplink and downlink transmission rate information about a traffic data stream, uplink and downlink Quality of Service information about the traffic data stream, packet data convergence protocol (PDCP) serial number information about a downlink traffic data stream, security operation information about an uplink traffic data stream or PDCP data packet recovery information about the uplink traffic data stream; or configuration parameter information for analyzing and counting a working status and a resource status of a processing unit of the UP entity, which comprises at least one of: a baseband resource duty ratio of the processing unit, a baseband resource busy-idle ratio of the processing unit, fault information about the processing unit, a number of in-serving data radio bearers (DRBs) of the processing unit or a number of protocol data unit (PDU) sessions of the processing unit.

13. A non-transitory computer-readable storage medium, which is configured to store computer-executable instructions, wherein the computer-executable instructions are used for executing the steps of:

determining, by a control plane (CP) entity, content to be counted, an object and a reporting policy for performing a synchronisation operation, wherein the synchronisation operation comprises at least one of a working status synchronisation operation or a resource status synchronisation operation, the object for performing the synchronisation operation comprises at least one of one or more DRBs, one or more PDU sessions, a UE, a plurality groups of UEs or a processing unit of a designated UP entity, and the reporting policy comprises at least one of: designated event trigger reporting, time period trigger reporting or periodic reporting triggered by a designated event; and sending, by the CP entity, a request for the synchronisation operation to a user plane (UP) entity, wherein the request carries configuration information about the content to be counted, the object and the reporting policy for the synchronisation operation;

wherein the configuration information about the content to be counted comprises at least one of:

configuration parameter information for analyzing and counting a working status of a user traffic data stream, which comprises at least one of: uplink and downlink transmission rate information about a traffic data stream, uplink and downlink Quality of Service information about the traffic data stream, packet data convergence protocol (PDCP) serial number information about a downlink traffic data stream, security operation information about an uplink traffic data stream or PDCP data packet recovery information about the uplink traffic data stream; or configuration parameter information for analyzing and counting a working status and a resource status of a processing unit of the UP entity, which comprises at least one of: a baseband resource duty ratio of the processing unit, a baseband resource busy-idle ratio of the processing unit, fault information about the processing unit, a number of in-serving data radio bearers (DRBs) of the processing unit or a number of protocol data unit (PDU) sessions of the processing unit.

14. A network element, comprising:

a transceiver, a memory and a processor;

wherein the processor is connected to the transceiver and the memory separately, and configured to control information transceiving of the transceiver and information storage of the memory by executing computer-executable instructions and to implement the steps of:

determining, by a control plane (CP) entity, content to be counted, an object and a reporting policy for performing a synchronisation operation, wherein the synchronisation operation comprises at least one of a working status synchronisation operation or a resource status synchronisation operation, the object for performing the synchronisation operation comprises at least one of one or more DRBs, one or more PDU sessions, a UE, a plurality groups of UEs or a processing unit of a designated UP entity, and the reporting policy comprises at least one of: designated event trigger reporting, time period trigger reporting or periodic reporting triggered by a designated event; and sending, by the CP entity, a request for the synchronisation operation to a user plane (UP) entity, wherein the request carries configuration information about the content to be counted, the object and the reporting policy for the synchronisation operation;

wherein the configuration information about the content to be counted comprises at least one of:

configuration parameter information for analyzing and counting a working status of a user traffic data stream, which comprises at least one of: uplink and downlink transmission rate information about a traffic data stream, uplink and downlink Quality of Service information about the traffic data stream, packet data convergence protocol (PDCP) serial number information about a downlink traffic data stream, security operation information about an uplink traffic data stream or PDCP data packet recovery information about the uplink traffic data stream; or configuration parameter information for analyzing and counting a working status and a resource status of a processing unit of the UP entity, which comprises at least one of: a baseband resource duty ratio of the processing unit, a baseband resource busy-idle ratio of the processing unit, fault information about the processing unit, a number of in-serving data radio bearers (DRBs) of the processing unit or a number of protocol data unit (PDU) sessions of the processing unit.

15. The method of claim 10, wherein the request for the synchronisation operation, the response to the synchronisation operation and the counting result of the synchronisation operation are born through signaling of an E1 interface between the CP entity and the UP entity.

16. The apparatus of claim 11, wherein the first determining module is further configured to determine an action type of the synchronisation operation, wherein,
   the action type of the synchronisation operation comprises at least one of: setup and start, modification and reconfiguration, or deletion and stop; and
   the request further carries configuration information about the action type.

17. The apparatus of claim 11, further comprising:
   a first receiving module, which is configured to receive a response to the synchronisation operation sent by the UP entity, where the response carries feedback information about accepting or rejecting the request, and in response to determining that the request is accepted, the response further carries feedback information about accepting all or part of the configuration information carried in the request.

18. The apparatus of claim 17, wherein the first receiving module is further configured to receive a counting result of the synchronisation operation reported by the UP entity.

19. The apparatus of claim 18, further comprising:
   a first executing module, which is configured to perform a corresponding control plane (CP) response operation according to the received counting result.

* * * * *